(12) United States Patent
Bowman

(10) Patent No.: US 6,353,804 B1
(45) Date of Patent: Mar. 5, 2002

(54) METHOD FOR STATISTICALLY PREDICTING EQUIPMENT PERFORMANCE

(75) Inventor: Michael John Bowman, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/288,919

(22) Filed: Apr. 9, 1999

(51) Int. Cl.[7] .................. G06F 101/14; G06F 17/18
(52) U.S. Cl. .................. 702/181; 702/179; 702/182; 700/52; 700/287; 700/291
(58) Field of Search .................. 702/179, 181, 702/182; 700/51, 52, 286–287, 291; 165/272, 274, 276; 60/646, 657

(56) References Cited

U.S. PATENT DOCUMENTS

| | | | | |
|---|---|---|---|---|
| 4,912,732 A | * | 3/1990 | Singh | 376/211 |
| 5,027,751 A | * | 7/1991 | Archer et al. | 700/283 |
| 5,136,848 A | * | 8/1992 | Silvestri, Jr. | 60/646 |
| 5,301,118 A | * | 4/1994 | Heck et al. | 702/179 |
| 5,454,426 A | * | 10/1995 | Moseley | 165/136 |
| 5,791,147 A | * | 8/1998 | Earley et al. | 702/130 |

\* cited by examiner

*Primary Examiner*—Bryan Bui
(74) *Attorney, Agent, or Firm*—Patrick K. Patnode; Christian G. Cabou

(57) ABSTRACT

A method for predicting equipment performance. Input data representing an equipment parameter is obtained. The input data includes a range of values corresponding to the equipment parameter. The input data is provided to a model and a data set is generated corresponding to the model response to the input data. A set of equations is derived representing the data set. The set of equations is statistically processed to generate a probabilistic representation of equipment performance.

14 Claims, 4 Drawing Sheets

METHOD FOR STATISTICALLY PREDICTING EQUIPMENT PERFORMANCE

BACKGROUND OF THE INVENTION

The invention relates to a method for predicting equipment performance and in particular to use of a statistical method and a model to predict an expected distribution of the equipment performance as a function of variability in input data. One method to predict equipment performance is based on applying point definitions of input values to a model. A series of point definitions are obtained representing single values for a plurality of inputs. The point definitions are applied to a model of the equipment implemented, for example, on a computer. The model generates a single-point answer representing predicted performance of the equipment.

A drawback to this method of predicting performance is that the actual performance of the equipment is more accurately a range of values based on a range of inputs. To use this process to obtain a range answers would be a sizable task. This task would involve the input values to be statistically varied, entered into the model, the model executed, the point answer written down, and then the process repeated for the next set of input data. As can be imagined, to complete this effort with acceptable resolution would take an enormous amount of time and effort.

BRIEF SUMMARY OF THE INVENTION

An exemplary embodiment of the invention is directed to a method for predicting equipment performance. Input data representing an equipment parameter is obtained. The input data includes a range of values corresponding to the equipment parameter. The input data is provided to a model and a data set is generated corresponding to the model response to the input data. A set of equations is derived representing the data set. The set of equations is statistically processed to generate a probabilistic representation of equipment performance.

BRIEF DESCRIPTION OF THE DRAWINGS

Referring now to the drawings wherein like elements are numbered alike in the several FIGS.

DETAILED DESCRIPTION OF THE INVENTION

Figure 1:
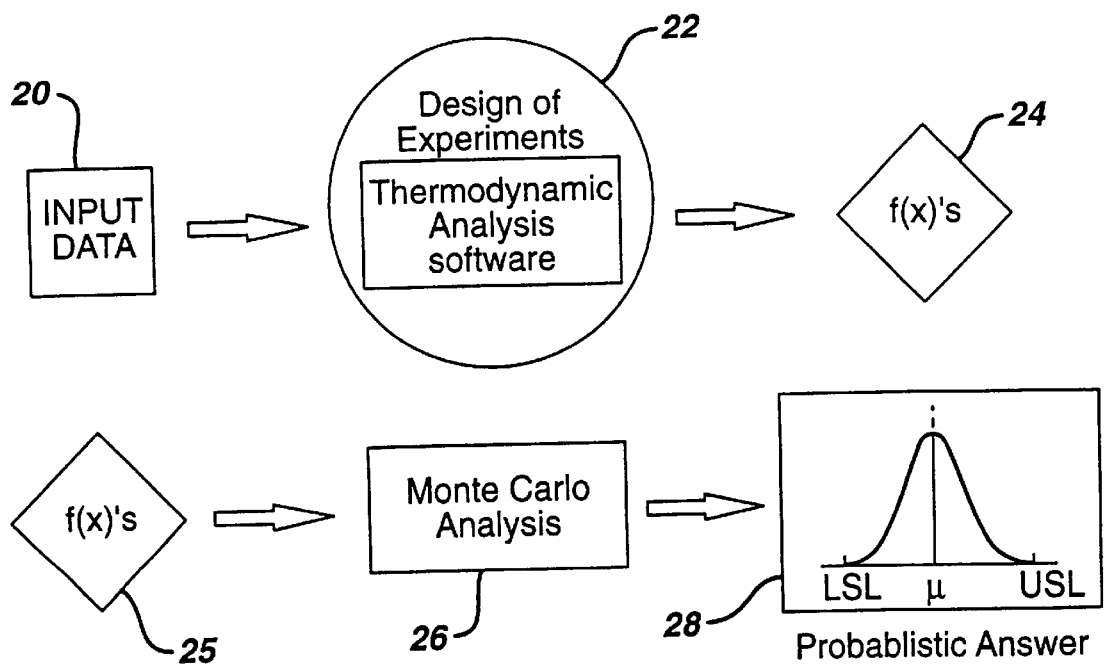
FIG. 1 is a block diagram of a method for predicting equipment performance in an exemplary embodiment of the invention.

FIG. 1 is a block diagram illustrating the process of predicting equipment performance in an exemplary embodiment of the invention. As shown in FIG. 1, input data 20 is provided to a design of experiments (DoE) which is implemented by computer software and used to predict equipment performance, generally referred to as a model 22. In the exemplary embodiment shown in FIG. 1, the model is a thermodynamic model representing steam turbine performance. It is understood that the invention may be applied to a variety of models and is not limited to steam turbines. The term equipment refers to a variety of objects including to machines (e.g., turbines) and articles of manufacture (e.g., a turbine blade). The input data 20 is a distribution of input values rather than a single input value. The distribution of input values corresponds to an equipment parameter such as a characteristic of the equipment (e.g., dimensional data) or an input to the equipment (e.g., fuel rate). The model 22 encompasses the expected range of input values and the result of the model is a large data set that describes a multi-dimensional surface representing the equipment performance.

The data set generated by the model is represented by a series of equations 24, shown as f(x), by fitting a set of equations to the data set. These equations 24 are essentially used to describe the output of model 22 (e.g., computer code) in algebraic terms so that statistical software and spreadsheets can easily be used. Once the computer code has been reduced to a set of equations 24, a model 25 is developed based on the equations 24 by arranging the equations 24 in a spreadsheet. Once the model 25 is built, a statistical routine 26 (e.g., a Monte Carlo analysis) is used to complete the process. The statistical routine 26 allows each input parameter to be described as a statistical distribution and any corresponding output variable to be monitored. Running the statistical process 26 takes statistically correct values for the given input distributions, runs the values through the developed equations, and tracks the resulting distribution on the output variables. The simulation is usually run for 10,000 iterations and results in a highly resolved answer.

The result of the statistical process 26 is a probabilistic answer 28 in the form of a distribution or range of output values and statistics corresponding to the range of output values. Exemplary statistics, shown in FIGS. 3 and 4, include mean, median, standard deviation and variance. The probabilistic answer 28 provides a very powerful tool for optimizing design performance. The interactions and influences between input parameters and output parameters can be easily determined, therefore a true optimum design can be found. By using distributions of input values 20 rather than single points, an understanding is gained about the tolerances needed on the input variables to achieve the desired output.

Figure 2:
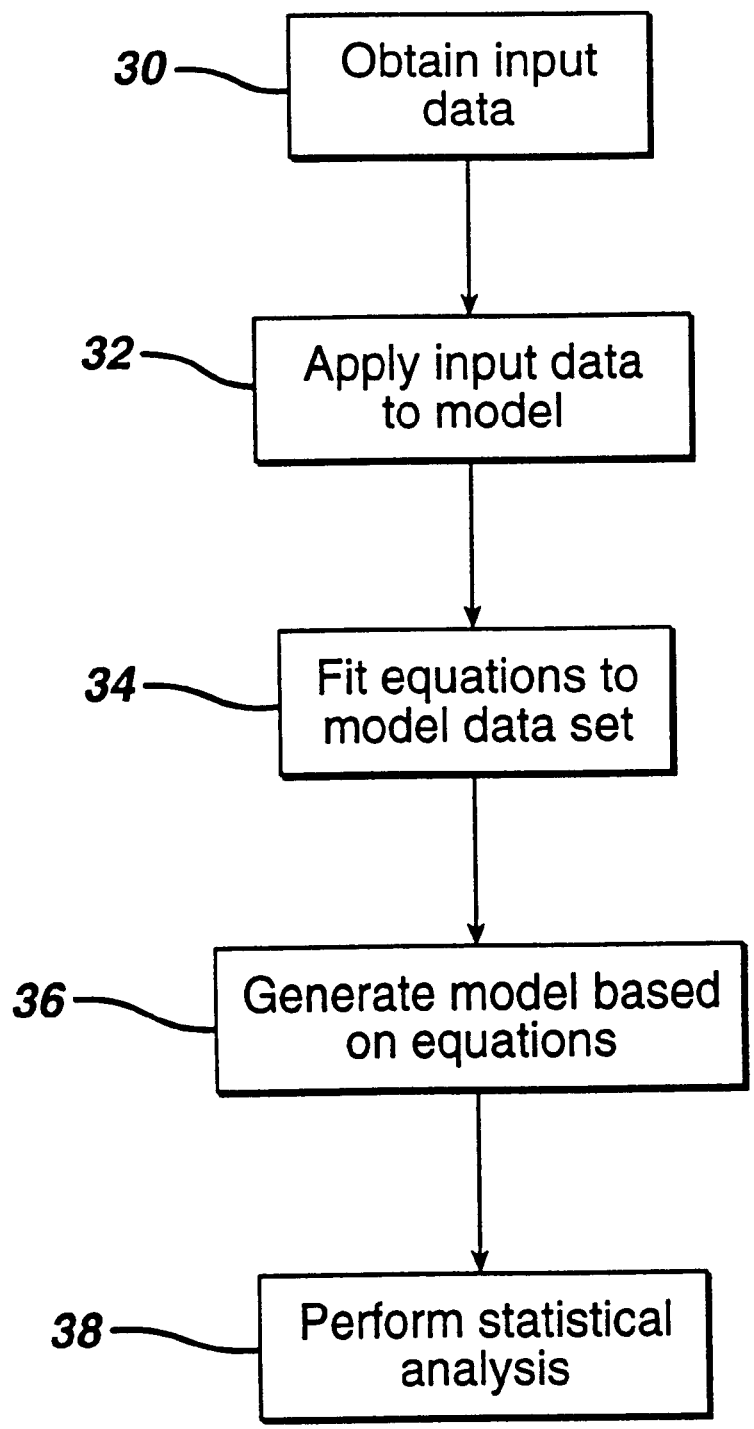
FIG. 2 is a flowchart of a method for predicting equipment performance in an exemplary embodiment of the invention.

FIG. 2 is a flowchart of a process for predicting equipment performance in accordance with an exemplary embodiment of the invention. At step 30, input data representing a distribution of input values is obtained. At step 32, the input data is applied to a model of the equipment. As noted above, the model may have a variety of forms such as simulating operation of a machine or simulating characteristics of an object. Execution of the model at step 32 generates a data set and at step 34, a set of equations are derived to fit the data set. The equations derived at step 34 are used to generate a model at step 36 and at step 38, a statistical process is performed on the equations. The statistical process at step 38 generates a probabilistic answer which includes a distribution and statistics on each output value.

Application of an exemplary embodiment of the invention to a steam turbine will now be described. The process shown in FIGS. 1 and 2 was executed with a generic steam turbine model and the results are described herein. For this example, seven input parameters 20 (bucket rip clearance, shaft packing clearance, wheelhole area, nozzle trailing edge thickness, nozzle throat area, bucket throat area, and vortex coefficient) were used with a ½ fraction DoE 22 to generate the data set used to establish equations 24. Also, for this study, the input data 20 was modeled as normally distributed values with limits of ±3σ and ±1σ. As described below with reference to FIGS. 3 and 4, using two different limits on the input data illustrates the significance of the input variability on the output distribution.

Figure 3:
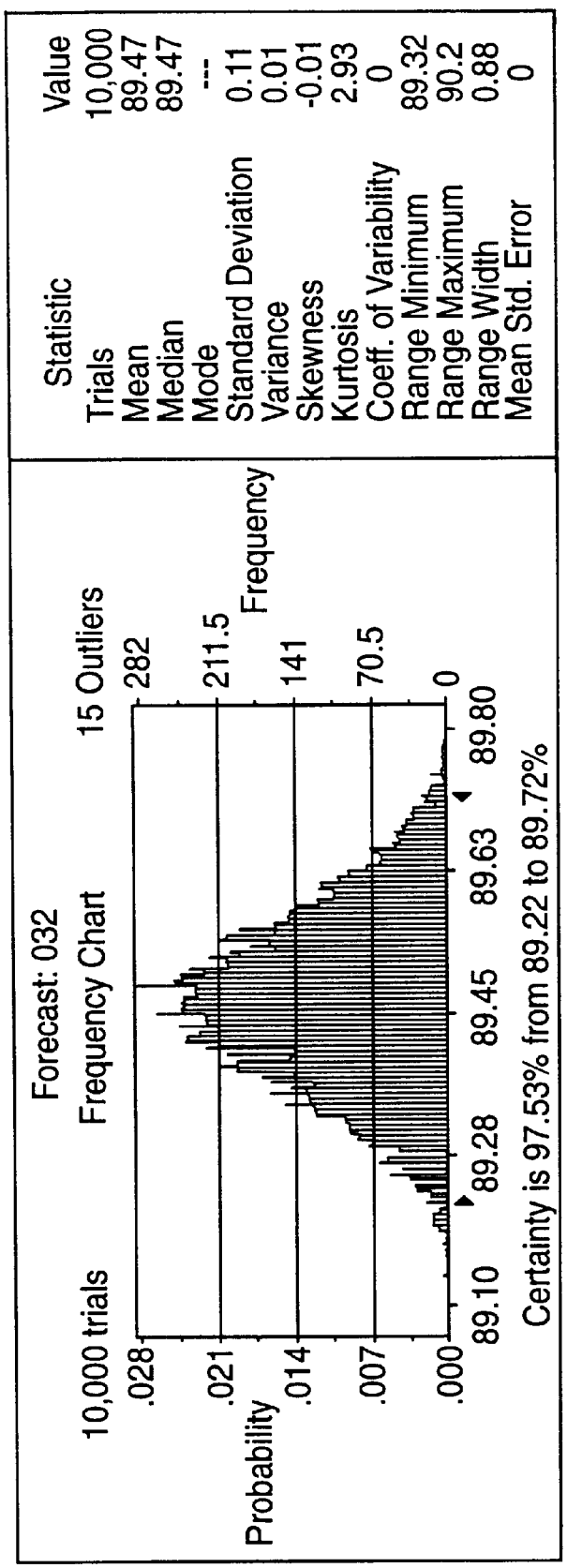
FIG. 3 illustrates a probabilistic answer using a range of input data.
Figure 4:
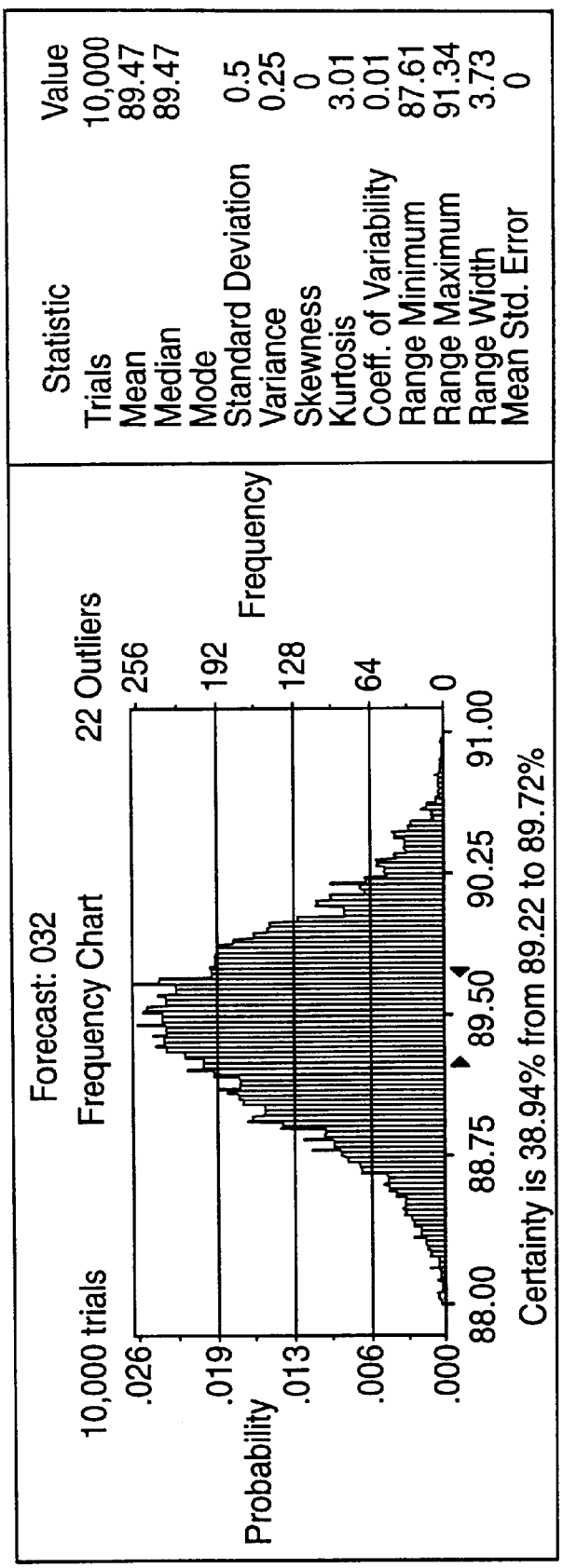
FIG. 4 illustrates a probabilistic answer using an alternate range of input data.

FIGS. 3 and 4 show frequency charts generated by the present invention for an output value (referenced as O32) for input distributions limited at predetermined limits of ±3σ and ±1σ, respectively. FIGS. 3 and 4 illustrate that the probabilistic answer 28 is in the form of a distribution. With the use of the present invention, the result is a distribution rather than a single point answer. With the present invention, real world distributions of input values are used to obtain expected distributions of predicted values.

The generation of a probabilistic answer in the form of a distribution facilitates understanding the consequence of the input parameter variations. FIG. 3 shows a distribution with a standard deviation of 0.11, while in FIG. 4, the standard distribution increases to 0.5. This change in variation is significant and would have normally been overlooked using the single point method described above. In addition, the present invention allows for the variation of a single parameter distribution to evaluate the benefits of process improvement.

As noted above, the invention may be applied to other types of equipment. For example, the model may represent a medical clamp, the input data may represent a statistical distribution of clamp dimensions and the output probabilistic answer may represent clamp tension. The present invention would allow the user to alter manufacturing tolerances on the input data and view the affect on the statistical distribution of clamp tension.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The invention provides a probabilistic answer having increased resolution (as compared to a single point answer) and decreases the amount of time required for completion. Analyzing input distributions, as opposed to input points, allows for a more optimized design and an increased robustness to variations in components. Accordingly, the invention results in a more rigorous analysis of a system with results being more accurate and complete.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for predicting equipment performance comprising:

obtaining input data representing an equipment parameter, said input data including a range of values corresponding to said equipment parameter;

providing said input data to a model and generating a data set corresponding to the model response to said input data;

deriving a set of equations representing said data set; and statistically processing said set of equations to generate a probabilistic representation of equipment performance; and generating a spreadsheet model in response to said set of equations;

wherein said statistically processing processes said spreadsheet model.

2. The method of claim 1 wherein:

deriving said set of equations includes fitting equations to said data set.

3. The method of claim 1 wherein:

statistically processing said set of equations includes performing a Monte Carlo routine.

4. The method of claim 1 wherein:

said model represents a steam turbine.

5. The method of claim 1 wherein:

said range of values is limited by a predetermined limit.

6. The method of claim 1 wherein:

said probabilistic representation of equipment performance is a distribution of output values.

7. The method of claim 6 wherein:

said probabilistic representation of equipment performance includes statistics corresponding to said distribution.

8. A storage medium encoded with machine-readable computer program code for predicting equipment performance, the program code causing a computer to implement a method of:

obtaining input data representing an equipment parameter, said input data including a range of values corresponding to said equipment parameter;

providing said input data to a model and generating a data set corresponding to the model response to said input data;

deriving a set of equations representing said data set; and statistically processing said set of equations to generate a probabilistic representation of equipment performance; and generating a spreadsheet model in response to said set of equations;

wherein said statistically processing processes said spreadsheet model.

9. The storage medium of claim 8 wherein:

deriving said set of equations includes fitting equations to said data set.

10. The storage medium of claim 8 wherein:

statistically processing said set of equations includes performing a Monte Carlo routine.

11. The storage medium of claim 8 wherein:

said model represents a steam turbine.

12. The storage medium of claim 8 wherein:

said range of values is limited by a predetermined limit.

13. The storage medium of claim 8 wherein:

said probabilistic representation of equipment performance is a distribution of output values.

14. The storage medium of claim 13 wherein:

said probabilistic representation of equipment performance includes statistics corresponding to said distribution.

* * * * *